(12) United States Patent
Bent et al.

(10) Patent No.: US 11,379,150 B2
(45) Date of Patent: Jul. 5, 2022

(54) DISK ARRAY USING MULTIPLE ACTUATOR DRIVES WITH LOGICAL UNITS COUPLED TO ACTIVE AND PASSIVE SERVERS

(71) Applicant: Seagate Technology LLC, Cupertino, CA (US)

(72) Inventors: John Michael Bent, Los Alamos, NM (US); Ian Davies, Longmont, CO (US); Mohamad El-Batal, Superior, CO (US); Ujjwal Lanjewar, Kharadi (IN)

(73) Assignee: Seagate Technology LLC, Fremont, CA (US)

( * ) Notice: Subject to any disclaimer, the term of this patent is extended or adjusted under 35 U.S.C. 154(b) by 341 days.

(21) Appl. No.: 16/777,988

(22) Filed: Jan. 31, 2020

(65) Prior Publication Data

US 2021/0240386 A1   Aug. 5, 2021

(51) Int. Cl.
*G06F 11/20* (2006.01)
*G06F 3/06* (2006.01)
*G11B 33/04* (2006.01)
*G11B 5/53* (2006.01)

(52) U.S. Cl.
CPC .......... *G06F 3/0659* (2013.01); *G06F 3/0619* (2013.01); *G06F 3/0689* (2013.01); *G06F 11/2094* (2013.01); *G11B 5/53* (2013.01); *G11B 33/0466* (2013.01); *G06F 2201/82* (2013.01)

(58) Field of Classification Search
CPC ............. G06F 11/1076; G06F 11/2092; G06F 11/2094; G06F 2201/82; G06F 3/0619; G06F 3/0635; G06F 11/20
See application file for complete search history.

(56) References Cited

U.S. PATENT DOCUMENTS

| | | | |
|---|---|---|---|
| 5,124,987 A | 6/1992 | Milligan et al. | |
| 5,787,463 A | 7/1998 | Gajjar | |
| 8,677,063 B2 | 3/2014 | Becker-Szendy et al. | |
| 9,826,030 B1 * | 11/2017 | Dhoolam | H04L 67/1008 |
| 9,826,041 B1 * | 11/2017 | Dhoolam | H04L 67/1095 |
| 10,395,691 B1 * | 8/2019 | Maung | G11B 20/1816 |
| 10,482,911 B1 * | 11/2019 | Nanjunda Swamy | G06F 11/2087 |
| 10,664,172 B1 * | 5/2020 | Trantham | G06F 3/0613 |
| 2005/0050381 A1 * | 3/2005 | Maddock | G06F 11/2087 714/E11.034 |
| 2008/0005470 A1 * | 1/2008 | Davies | G06F 3/0632 711/164 |

(Continued)

*Primary Examiner* — Kamini B Patel
(74) *Attorney, Agent, or Firm* — Mueting Raasch Group (57) ABSTRACT

Each disk drive in an array includes a housing that encloses a motor and at least one magnetic disk. The housing also encloses first and second actuators each with respective first and second heads that independently access the magnetic disk. The first actuator is mapped to a first logical unit and the second actuator is mapped to a second logical unit. A host interface of each disk drive facilitates access to the first and second logical units. A system includes a first storage controller attached to all of the first logical units as a first active server and attached to all of the second logical units as a first passive server. A second storage controller operates redundantly with the first storage controller. The second storage controller is attached to all of the second logical units as a second active server and attached to all of the first logical units as a second passive server.

20 Claims, 5 Drawing Sheets

(56) References Cited

U.S. PATENT DOCUMENTS

2019/0391889 A1\* 12/2019 Luo .................... G06F 11/2094
2021/0064239 A1\* 3/2021 Caldwell, Jr. ........... G06F 3/064

\* cited by examiner

FIG. 8

DISK ARRAY USING MULTIPLE ACTUATOR DRIVES WITH LOGICAL UNITS COUPLED TO ACTIVE AND PASSIVE SERVERS

SUMMARY

The present disclosure is directed to a disk array with multiple actuator drives with logical units coupled to active and passive servers. In one embodiment, each disk drive in an array includes a housing that encloses a motor and at least one magnetic disk. The housing also encloses first and second actuators each comprising respective first and second heads configured to independently read from and write to the at least one magnetic disk. The first actuator is mapped to a first logical unit and the second actuator is mapped to a second logical unit. A host interface of each disk drive facilitates access to the first and second logical units. A first storage controller is attached to all of the first logical units as a first active server and attached to all of the second logical units as a first passive server. A second storage controller operates redundantly with the first storage controller. The second storage controller is attached to all of the second logical units as a second active server and attached to all of the first logical units as a second passive server.

In another embodiment, each disk drive in an array includes N logical units, wherein N>1. A housing of each disk drive encloses a motor, at least one disk, and N actuators each associated with a respective one of the N logical units and configured to independently read from and write to the at least one disk. A host interface of each disk drive facilitates access to the N logical units. N storage controllers are each attached to a respective one of the N-logical units of each disk drive as an active server. Each of the N storage controllers is attached to at least one other of the logical units of each disk drive as a passive server. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to large-scale data storage systems. Modern data storage systems (e.g., cloud storage) utilize parallelism and redundancy to both improve performance and reliability. Systems may generally employ what is commonly referred to as RAID (Redundant Array of Independent Disks) where a plurality of disks are pooled together to form logical volumes. Each disk holds a part of the data (e.g., a chunk), and a subset of the chunks are set up to store redundancy data (e.g., parity). The storage controller assembles the chunks into RAID stripes (e.g., RAID 6+2 stripe with six chunks of data and two chunks of parity). The addition of the parity data allows recreating data in the event of a failure of a disk on which stripes of the volume are stored.

In current RAID systems, maximizing the size of the pool is one way to improve rebuild speeds with larger pools. For example, in systems that use declustered parity, the parity and data of chunks is spread across a large number of disks such that each disk has a combination of parity and data from different stripes. When a drive fails, the stripes can be rebuilt by reading data from a large number of drives at once, thereby reducing the rebuild time.

Due to high availability requirements, a disk array may use two controllers in an active-active arrangement, where each controller actively manages part of the storage array and passively monitors another part of the array. For example, one controller may actively manage a first half of the drives and passively monitor a second half of the drives. A second controller actively manages the second half of the drives and passively monitors the first half of the drives. In this case, active management generally means that the controller services host read and write requests using the drives it is actively managing. Passive monitoring generally involves monitoring the state of the drives but not performing any reading or writing from/to those drives unless the active controller has failed.

In this type of high-availability arrangement, each drive is typically actively managed by only one controller. Therefore, the maximum pool size in RAID systems are typically only half of the possible drives within the enclosure (or set of daisy-chained enclosures). For example, a data storage rack unit with space for 106 drives and two storage controllers in an active-active arrangement can have a max pool size of only 53 drives. This reduces rebuild times (and correspondingly improves durability) somewhat but not as much as it could be reduced if it had a larger pool. For example, in FIG. 2, a graph shows how pool size can affect rebuild time according to an example embodiment.

Figure 2:
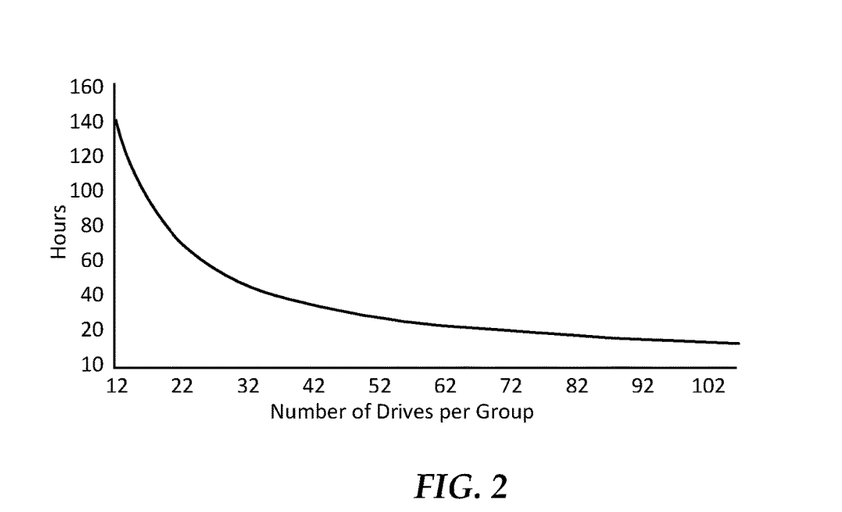
FIG. 2 is graph showing the effect of drive pool size on rebuild time in a disk array according to example embodiments.

In FIG. 2, the curve shows an estimate of rebuild time as a function of pool size for a set of RAID 6 stripes, each stripe having eight chunks of data with two stripes of parity. The drives are assumed to be 14 TB in size and rebuild throughput is 50 MB/s for read and write. For a 53 drive pool, the rebuild time is estimated to be around 28 hours. With 106 drives, that time would reduce to around 16 hours.

To get a larger pool with standard drives would involve partitioning the drives and having both controllers access one partition on each drive. This would improve rebuild but would hurt performance because the two controllers would face contention when trying to access the storage media, as the read/write heads can only service one request at a time. However, if each drive could service two requests simultaneously, then each storage controller could access part of every drive, and allow having the pools maximize the available drive array, e.g., two pools of 106 drives in the example above, and do so without hurting performance.

Figure 1:
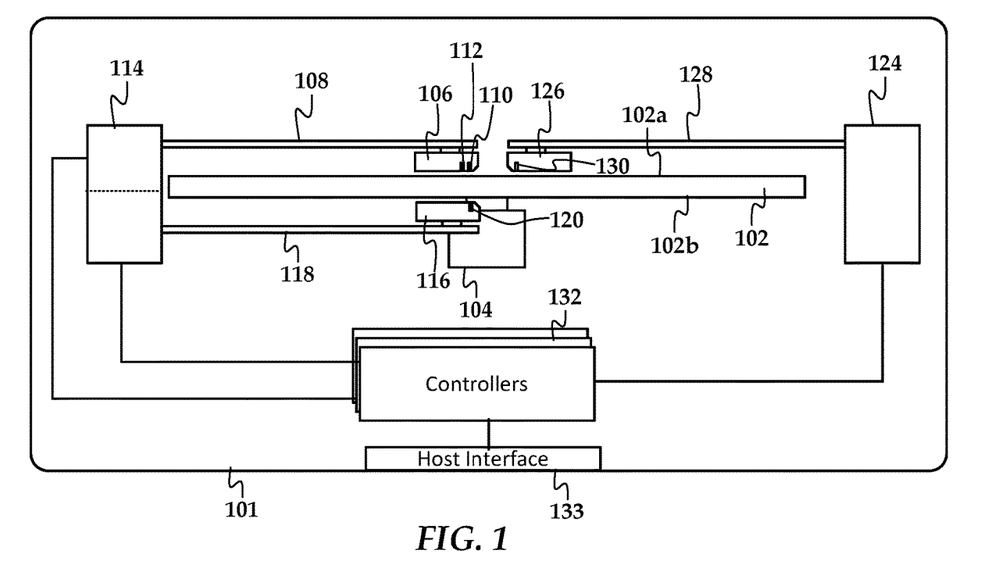
FIG. 1 is a diagram of a multiple actuator drive according to an example embodiment.

In embodiments described herein, a storage array with multiple controllers utilizes dual actuator disk drives that can simultaneously service requests from multiple storage array controllers, a feature referred to herein as parallelism. In FIG. 1, a diagram illustrates an apparatus 100 (e.g., data storage drive) with parallelism features according to example embodiments. The apparatus 100 includes a housing 101 that holds at least one magnetic disk 102 driven by a spindle motor 104. A slider 106 (also referred to as a head, read/write head, read head, write head, recording head, etc.) is held over a first surface 102a of the disk 102 by an arm 108. An actuator 114 (e.g., a voice-coil motor or VCM) moves (e.g., rotates) the arm 108 to place the slider 106 over different tracks on the disk 102. The slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator with two VCM sections). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116 and its associated actuation hardware). The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to the same disk surface 102a simultaneously with transducers 110, 112 of first slider 106.

In the examples shown in FIG. 1, more than one disk 102 may be used, and the actuators 114, 124 may be coupled to additional arms and heads that simultaneously access some or all of the additional disk surfaces. In this context, "accessing" generally refers to electrically activating a read or write transducer and coupling the transducer to a read/write channel to facilitate reading from and writing to the disk. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time.

As noted above, the actuators 114, 124 include VCMs that rotate the arms 108, 118, 128 about respective axes. The VCM-type actuators provide coarse positioning, the heads 106, 111, 124, e.g., for long seeks. The heads 106, 111, 124 may also be finely positioned by microactuators (not shown) that mechanically couple the heads to the arms 108, 118, 128. These microactuators can move independently of the VCMs 114, 124 and from each other, and are mostly used to maintain alignment of the heads 106, 116, 126 over the tracks during track-following.

One or more system controllers 132 are coupled to the respective actuators 114, 124 and control movement of the actuators 114, 124. The system controllers 132 may include systems on a chip that perform such operations as servo control, encoding and decoding of data written to and read from the disk 102, queuing and formatting host commands, etc. If more than one system controller 132 is used, the multiple controllers 132 may have the ability to execute multiple media read/write operations concurrently. For example, the system controllers 132 may be able to present the apparatus 100 as two separate logical drive units via a host interface 133 to two separate storage array controllers (not shown), such that the apparatus can be used in a high-availability storage array as described herein. The host interface 133 may communicate with a storage controller using existing data storage protocols such as SCSI, SATA, SAS, NVMe, Ethernet, etc.

Figure 3:
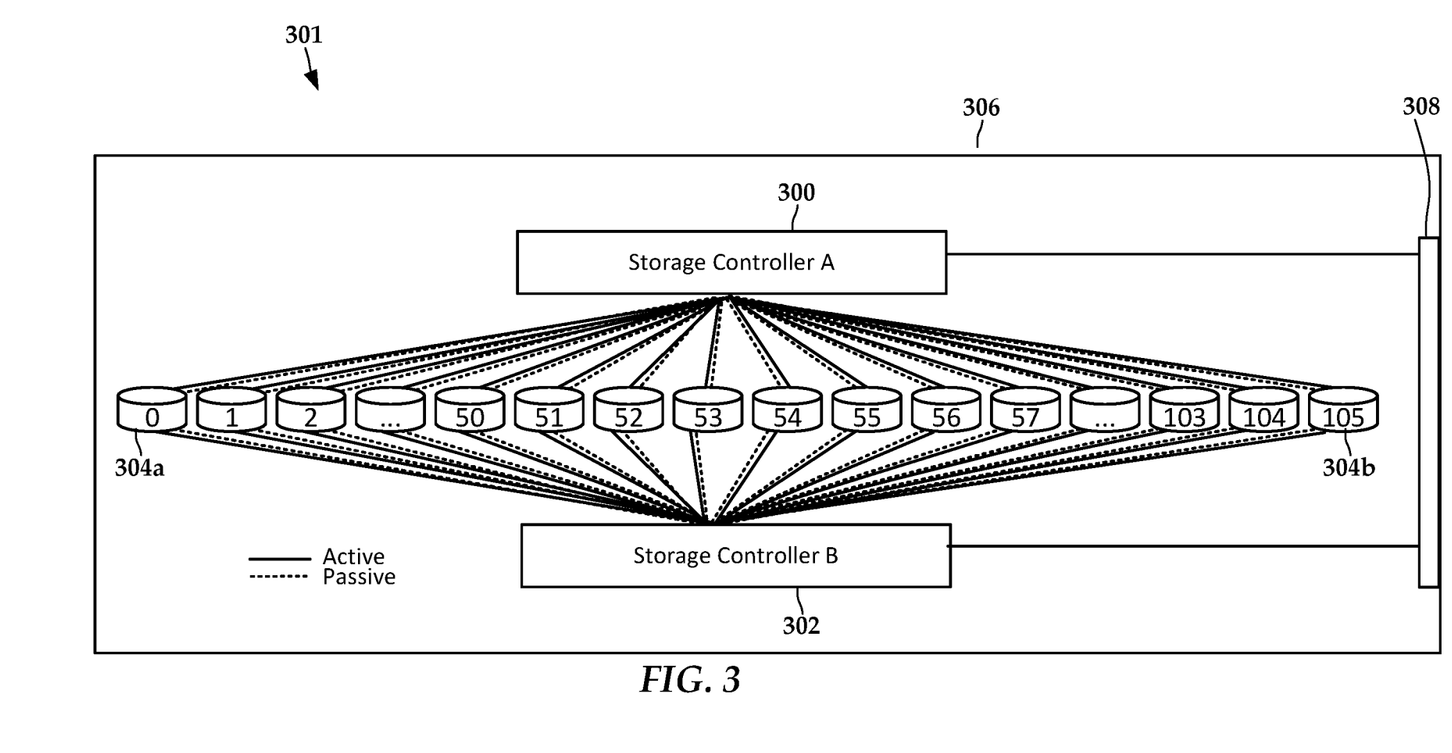
FIGS. 3 and 4 are block diagrams of a disk array according to an example embodiment.

In FIG. 3, a block diagram illustrates a drive array system 301 according to an example embodiment. First and second storage controllers 300, 302 are coupled to an array of disk drives 304. As indicated by the respective solid and dashed lines, each of the controllers is coupled to one of the drives in both a passive and active mode. Each of the drives 304 includes at least two independent actuator sections and each of which is actively controlled by just one of the controllers 300, 302. The drive array system 301 may include an enclosure 306 (e.g., rack mount enclosure) that houses the drives 304 and the controllers 303, 302. A data transfer interface 308 (e.g., Ethernet) may be used to facilitate access to the array by computation units of a data center. Additional details of the controller-to-drive coupling is shown in FIG. 4.

Figure 4:
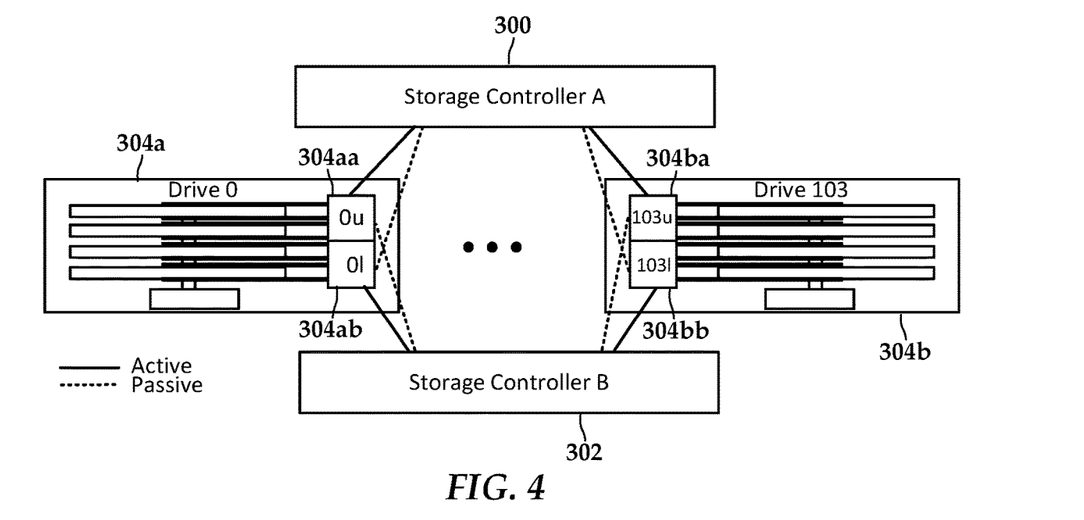

In FIG. 4, internal details of drives 304a and 304b are shown. Drive 304a has two actuator sections 304aa and 304ab, which are indicated as being respectively assigned to upper and lower logical unit numbers (LUNs) within the drive 304a. Similarly, drive 304b has two actuator sections 304ba and 304bb, which are respectively assigned to upper and lower LUNs. Note that the actuator sections in these drives are split actuators that rotate around a common axis. This allows the housings of the drives 304a, 304b to maintain existing physical form factors (e.g., 3.5 inch form factor), although each actuator can only access a portion of the total surface area. Note that the terms "upper" and "lower" in reference to the drive LUNs are applied arbitrarily and are not intended to suggest any particular orientation or order of the drives, order of physical/logical addresses, etc. Further, while a storage controller may be described, for example, as being coupled to first or second logical units of a plurality of disk drives, this does not require that, for example, the first logical units all have some defining characteristic such as LUN identifier or logical address range. The terms "first logical unit" and "second logical" unit merely implies that each disk drive has two separate logical units that are being grouped with other logical units of other drives in a similar fashion.

When a failure occurs in the illustrated drive array, the first storage controller 300 will rebuild the upper LUN of the failed drive in parallel with server B rebuilding the lower LUN of the failed drive. In a classic declustered parity with 106 drives, the rebuild time would be expected to be about 16 hours. However, with this proposed configuration, the rebuild time would be further halved since each server would rebuild its half in parallel with the other so the expected rebuild time would be down to 8 hours.

Figure 5:
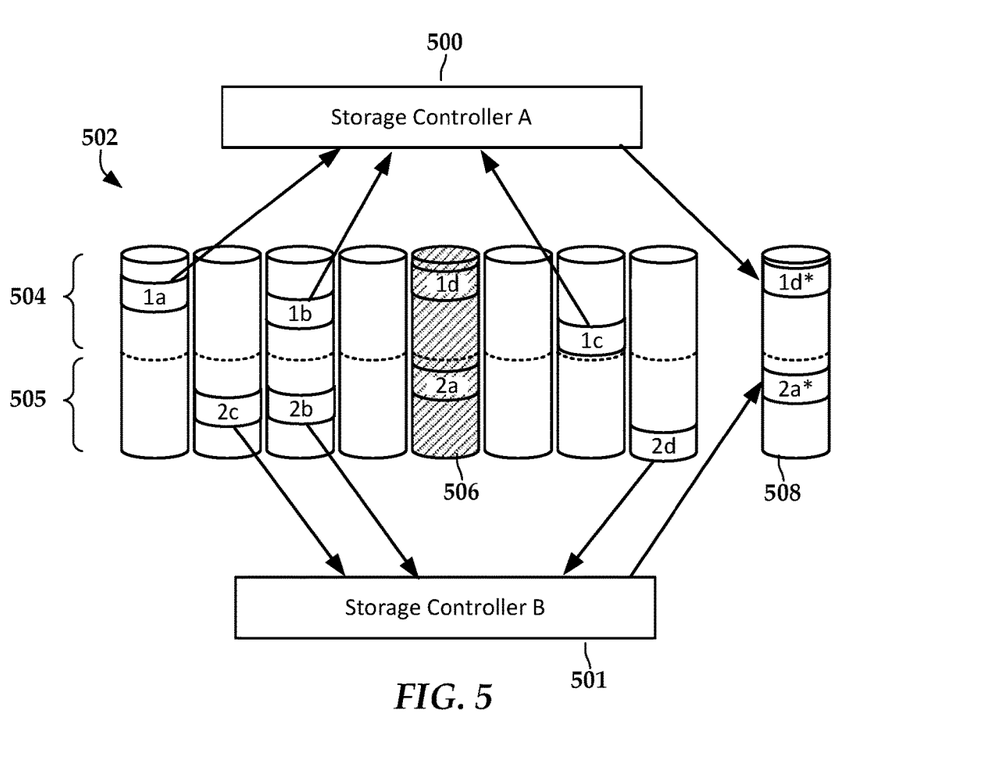
FIG. 5 is a simplified block diagram showing rebuilding operations in a disk array according to an example embodiment.

In FIG. 5, a block diagram shows a simplified example of a rebuild in a drive array according to an example embodiment. First and second controllers 500, 501 are coupled to all of the drives in an array 503. The drives are all divided into first and second logical units 504, 505, each logical unit being mapped to an independently operable actuator within the drives. The first storage controller 500 is attached to all of the first logical units 504 as a first active server and attached to all of the second logical units 505 as a first passive server. The second storage controller 501 operates redundantly with the first storage controller 500, and is attached to all of the second logical units 505 as a second active server and attached to all of the first logical units 504 as a second passive server In this example, a first stripe of the first logical units 504 includes chunks 1*a*-1*d* and second stripe of the second logical units 505 includes chunks 2*a*-2*d*. These chunks 1*a*-1*d*, 2*a*-*dd* may include any combination of data and parity, and in most arrangements the stripes will include more than four chunks per stripe. As indicated by the shading, drive 506 has failed, which will trigger a rebuild operation in which data from drive 506 is reproduced onto a replacement drive 508.

As indicated by the arrows, the first storage controller 500 is operable to rebuild first stripes associated with the first logical unit 504 of the failed drive 506. In parallel with the first storage controller 500, the second storage controller 501 is operable to rebuild second stripes associated with the second logical unit 505 of the failed drive 506. For the first stripe, this involves reading from chunks 1*a*-1*c* and using them to create chunk 1*d\ on the replacement drive 508, which is a recreation of chunk 1***d* on the failed drive 506. For the second stripe, this involves reading from chunks 2*b*-2*d* and using them to create chunk 2*a\ on the replacement drive 508, which is a recreation of chunk 1***d* on the failed drive 506. This would be repeated for any stripes of both logical units 504, 505 that had any chunks stored on the failed drive 506. Note that if only one logical unit of a drive fails (e.g., a head fails on one of the actuators), then only the active storage controller 500, 501 associated with that logical unit need perform a rebuild, and the other storage controller can operate as normal, while tracking the rebuild in passive mode.

Figure 6:
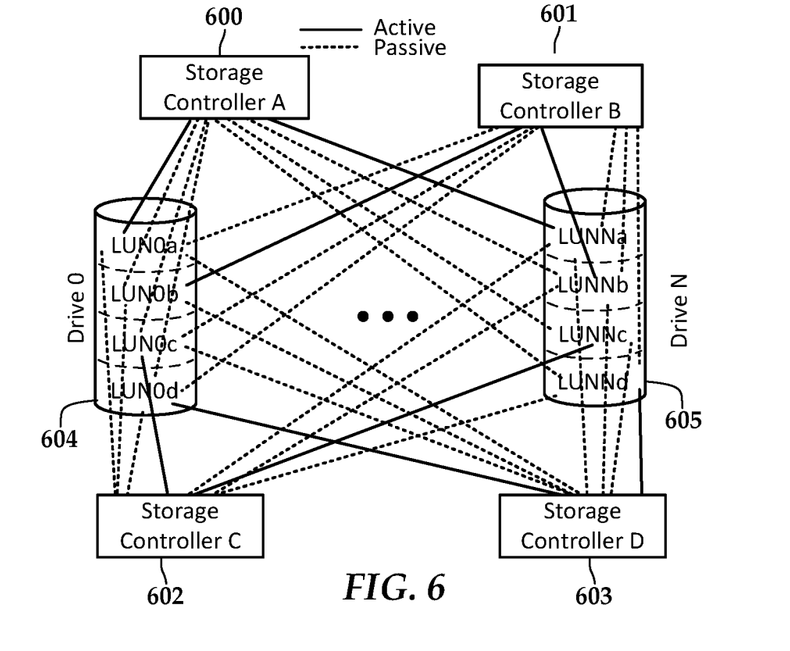
FIGS. 6 and 7 are diagrams showing a storage system with four controllers per array according to example embodiments.
Figure 7:
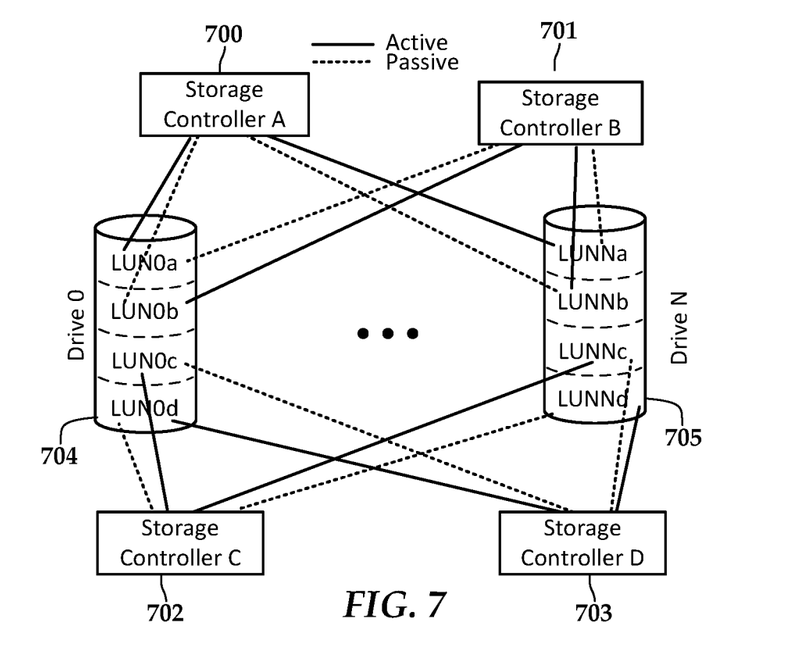

While the examples above show a system with two logical units per drive and two controllers per array, this can be extended generally to N-logical units per drive and/or N-controllers per array, where N>2. In the embodiment shown and described in FIG. 1, a drive may have an actuator that is split into three or more sections that rotate about the same axis. Or, the drive may have two split actuators that rotate about different axes. This may provide for up to N-way controller redundancy. Two systems with N=4 according to example embodiments are shown in FIGS. 6 and 7. Those of skilled in the art will be able to extend the concepts shown in FIGS. 6 and 7 to other values of N, e.g., N=3, N=5, etc.

In FIG. 6, four storage controllers 600-603 are coupled to a drive array, of which, two drives 604, 605 are shown. Each drive 604, 605 is divided into four logical units, e.g., LUN0*a*-LUN0*d* for drive 604. Storage controller 600 is actively coupled to all LUN*n*a and passively coupled to all LUN*n*b, LUN*n*c, and LUN*n*d, where n={0, 1, ... N}. The other storage controllers 601-603 are similarly actively coupled to a dedicated group of LUNs and passively coupled to all the LUNs not in the dedicated group. Thus, in this configuration each LUN on each disk has one active server controlling it and three (N-1) passive servers monitoring it. This will provide much higher levels of availability.

Note that if one controller fails, the one of other controller can take over all of the LUNs formerly managed by the failed controller. In the alternate, the remaining controllers can divide the LUNs formerly managed by the failed controllers into portions (e.g., even or uneven portions) each of the N-1 controllers taking respective portions of the LUNS as active servers. This can minimize performance impacts to all of the N-1 remaining controllers. The distribution of the LUNs of the failed controller to the remaining controllers may be based on some pre-arranged division or may be assigned dynamically (e.g., based on current workload) or randomly.

In FIG. 7, four storage controllers 700-703 are coupled to a drive array, of which, two drives 704, 705 are shown. Each drive 704, 705 is divided into four logical units, e.g., LUN0*a*-LUN0*d* for drive 704. Storage controller 700 is actively coupled to all LUN*n*a and passively coupled to all LUN*n*b, where n={0, 1, ... N}. Storage controller 701 is actively coupled to all LUN*n*b and passively coupled to all LUN*n*a. A similar arrangement is seen for controllers 702 and 703. Thus, in this configuration each LUN on each disk has one active server controlling it and one passive server monitoring it. This provides the same amount of redundancy per LUN as the previous example where N=2, however there will be less of an impact if one controller fails. For example, if controller 700 failed, then controller 701 would experience an increase in workload due to the failure, but controllers 702 and 703 would not. In either of the configurations of FIGS. 6 and 7, rebuild time of a failed drive could be up to half of that of the arrangement in FIG. 3, as four controllers could operate in parallel on four different independent logical unit on each disk.

Note that the configuration shown in FIG. 7 may be amenable to other connections between the controllers 700-703 and disk array. In the illustrated example, storage controller 700 acts as a backup for storage controller 701 across all disks, and vice versa. In some arrangements, the active-passive connections may be changed for different drives. For example, consider that the array has a Drive 1 (not shown) in which controller 700 is actively connected to LUN1*a* and storage controller 702 is passively coupled to LUN1*a*. This is different than the coupling arrangement for Drive 0 704, in which storage controller 701 is passively coupled to LUN0*a*. For Drive 1, storage controller 701 may be passively coupled to another LUN, e.g., LUN1*d*. These passive coupling may be made randomly or follow some repetitive order.

Figure 8:
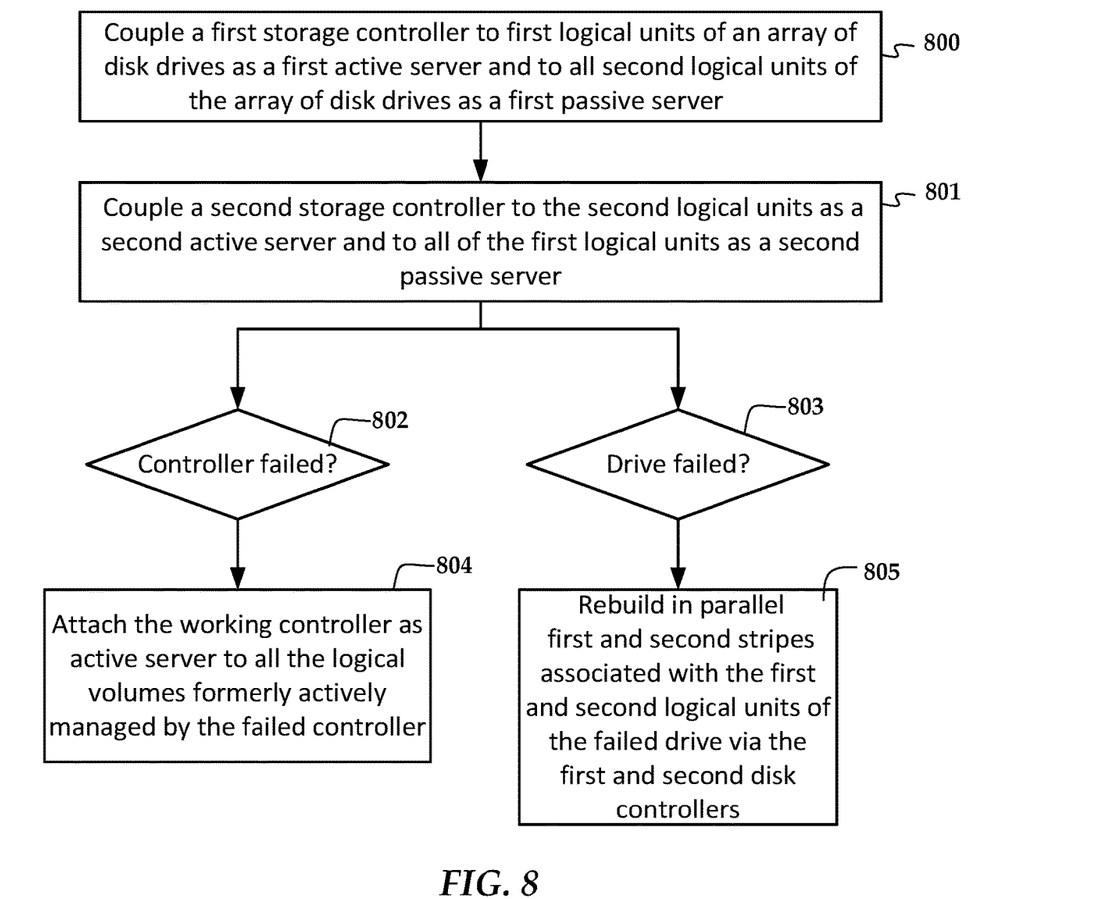
FIG. 8 is a flowchart of a method according to an example embodiment.

In FIG. 8, a flowchart shows a method according to an example embodiment. The method involves coupling 800 a first storage controller to first logical units of an array of disk drives as a first active server and to all second logical units of the array of disk drives as a first passive server. Each disk drive of the array includes an enclosure housing a motor that drives at least one disk, as well as first and second actuators each having respective first and second heads configured to independently read from and write to the at least one disk. The first actuator is mapped to one of the first logical units and the second actuator is mapped to one of the second logical units. A second disk is coupled 801 controller to the second logical units as a second active server and to all of the first logical units as a second passive server.

Decision blocks 802 and 803 represent events that may occur in the life of the disk array. At block 802, a failed controller (e.g., second controller) is detected, in which case the working controller (e.g., first controller) is attached 804 as an active server to all of the stripes formerly managed by the failed controller (e.g., second controller). At block 803, a failed drive is detected, in which case a parallel rebuilding 805 of first and second stripes occurs via the first and second storage controllers. The first and second stripes are associated with respective first and second logical units of the failed drive.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A system, comprising:
    an array of disk drives, each disk drive comprising:
        a housing that encloses a motor, at least one magnetic disk, and first and second actuators, each of the first and second actuators comprising respective first and second heads configured to independently read from and write to the at least one magnetic disk, the first actuator being mapped to a first logical unit and the second actuator being mapped to a second logical unit; and
        a host interface that facilitates access to the first and second logical units;
    a first storage controller attached to all of the first logical units as a first active server and attached to all of the second logical units as a first passive server; and
    a second storage controller operating redundantly with the first storage controller, the second storage controller attached to all of the second logical units as a second active server and attached to all of the first logical units as a second passive server.

2. The system of claim 1, wherein each of the disk drives comprise first and second independently operable controllers coupled to the respective first and second actuators and that service requests for the respective first and second logical units.

3. The system of claim 1, wherein the first and second actuators are split actuators rotating around a same axis.

4. The system of claim 1, wherein data is stored on the array of disk drives in as RAID stripes with declustered parity.

5. The system of claim 1, wherein upon detection of a failed drive in the array, the first storage controller rebuilds first stripes associated with the first logical unit of the failed drive, and in parallel with rebuilding by the first storage controller, the second storage controller rebuilds second stripes associated with the second logical unit of the failed drive.

6. The system of claim 1, wherein upon detection of a failure of the second storage controller, the first storage controller is attached to the second logical units as the second active server.

7. A method comprising:
    coupling a first storage controller to first logical units of an array of disk drives as a first active server and to second logical units of the array of disk drives as a first passive server, wherein each disk drive of the array comprises a housing that encloses a motor, at least one magnetic disk, and first and second actuators, each of the first and second actuators comprising respective first and second heads configured to independently read from and write to the at least one magnetic disk, the first actuator being mapped to one of the first logical units and the second actuator being mapped to one of the second logical units; and
    coupling a second storage controller to the second logical units as a second active server and to the first logical units as a second passive server.

8. The method of claim 7, wherein each of the disk drives comprise first and second independently operable system controllers coupled to the respective first and second actuators and that service requests for the respective first and second logical units.

9. The method of claim 7, wherein the first and second actuators are split actuators rotating around a same axis.

10. The method of claim 7, wherein data is stored on the array of disk drives in as RAID stripes with declustered parity.

11. The method of claim 7, further comprising:
    detecting a failed drive in the array, and in response thereto:
        rebuilding first stripes associated with the first logical unit of the failed drive via the first storage controller; and
        rebuilding second stripes associated with the second logical unit of the failed drive via the second storage controller in parallel with rebuilding of the first stripes by the first storage controller.

12. The method of claim 7, further comprising detecting a failure of the second storage controller and in response thereto, attaching the first storage controller to the second logical units as the second active server.

13. A system, comprising:
    an array of disk drives, each disk drive comprising:
        N-logical units, wherein N>1;
        a housing enclosing a motor, at least one disk, and N-actuators each associated with a respective one of the N-logical units and configured to independently read from and write to the at least one disk; and
        a host interface that facilitates access to the N-logical units; and
    N-storage controllers each attached to a respective one of the N-logical units of each disk drive as an active server; each of the N storage controllers attached to at least one other of the logical units of each disk drive as a passive server.

14. The system of claim 13, wherein N>2, and where each of the N-storage controllers is attached to N−1 other logical units of each drive as the passive server.

15. The system of claim 13, wherein N>2, and where each of the N-storage controllers is attached to one other logical unit of each drive as the passive server.

16. The system of claim 13, wherein data is stored on the array of disk drives in as RAID stripes with declustered parity.

17. The system of claim 13, wherein upon detection of a failed drive in the array, the N-storage controllers rebuild, in parallel, N-stripes associated with the N-logical units of the faded drive.

18. The system of claim 13, wherein upon detection of a failed one of the N-storage controllers, one of the other N-storage controllers takes over the active connections of the failed controller.

19. The system of claim 13, wherein N>2, and wherein upon detection of a failed one of the N-storage controllers, the other N−1 storage controllers each take over respective portions of the active connections of the failed storage controller.

20. The system of claim 13, wherein N>2, and wherein upon detection of a failed one of the N-storage controllers, the one of the other N-storage controllers takes over the active connections of the failed storage controller.

* * * * *

UNITED STATES PATENT AND TRADEMARK OFFICE
CERTIFICATE OF CORRECTION

PATENT NO. : 11,379,150 B2
APPLICATION NO. : 16/777988
DATED : July 5, 2022
INVENTOR(S) : John Michael Bent et al.

It is certified that error appears in the above-identified patent and that said Letters Patent is hereby corrected as shown below:

In the Claims

In Claim 13 Line 1, 'server;' should be -- server, --.

In Claim 17 Line 16, 'faded' should be -- failed --.

Signed and Sealed this
Eleventh Day of April, 2023

*Katherine Kelly Vidal*

Katherine Kelly Vidal
*Director of the United States Patent and Trademark Office*